Patented Nov. 17, 1936

2,061,159

UNITED STATES PATENT OFFICE 2,061,159

AZODYESTUFFS AND THEIR PRODUCTION

William Edward Kemmerich, Nyack, N. Y., assignor to General Aniline Works, Inc., New York, N. Y., a corporation of Delaware No Drawing. Application September 29, 1931, Serial No. 565,827

17 Claims. (Cl. 260—95)

The invention relates to new azo-dyestuffs which can be obtained by combining any diazo-compound with a 4-amino-diphenylide of 2,3-hydroxy-naphthoic acid. These dyestuffs correspond to the general formula:

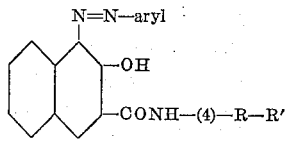

where R and R' may be the same or different radicles as well as substituted radicles, having halogen, nitro, hydroxy, methoxy, ethoxy, methyl, ethyl and phenyl groups.

The simplest representative of this class is the 4-amino-diphenylide of the 2,3-hydroxynaphthoic acid combined with a diazo-compound expressed in the following formula:

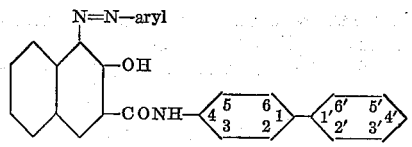

The dyestuffs can be used for the production of color lakes of excellent fastness to light and give, when produced on the fibre orange to red to blue and black shades of great intensity and excellent fastness to light, to kier boiling, to soaping and rubbing. They form in a dry state reddish to blackish powders insoluble in water, but soluble in sulphuric acid with a violet to greenish color.

The new dyestuffs are produced by combining a diazo-, a tetrazo- and diazo-azo- compound with a 2,3-hydroxynaphthoyl-4'-amino-diphenyl.

The production of these dyestuffs on the fibre gives particularly valuable results, these 4-amino-diphenylides of 2,3-hydroxynaphthoic acid being distinguished by having a great affinity to the vegetable fibre so that very strong and brilliant shades can be produced which are at the same time fast to rubbing. The 2,3-hydroxynaphthoyl-4-amino-diphenyls are apparently unknown hitherto. They may be prepared according to the process described in U. S. Patent 1,101,111 by allowing a 4-amino-diphenyl or a substituted 4-amino-diphenyl to react on 2,3-hydroxynaphthoic acid in the presence of a dehydrating agent, or by forming first the chloride of the 2,3-hydroxynaphthoic acid and bringing this product in contact with the amino compound.

For instance the 2-hydroxy-3-naphthoyl-4'-amino-diphenyl can be obtained in this manner; the product represents light greyish crystals, when crystallized from toluene, which melt above 265° C. under decomposition.

In order to further illustrate my invention the following examples are given, the parts being by weight, but it is understood that my invention is not limited to the particular products mentioned or to the reaction conditions given therein.

Example 1

A diazo solution prepared in the usual manner from 162 parts of 2,5-dichloraniline is run under continuous stirring into a solution in dilute caustic soda solution of 340 parts of 2,3-hydroxynaphthoyl 4'-amino-diphenyl containing sufficient sodium acetate to neutralize the excess mineral acid of the diazo-solution. A bright yellowish red precipitate is formed, which is filtered and washed. The pigment dyestuff so obtained may be used as such or its metal lakes, for instance the barium, aluminum, chromium lakes may be formed. The color is very brilliant and fast to light. It has probably the following constitution:

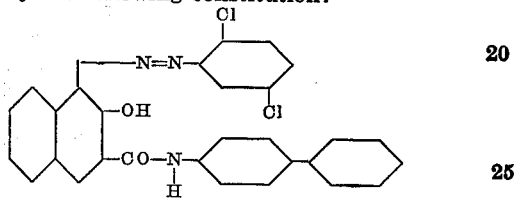

Example 2

For the production on the fibre the following example may serve:

Cotton yarn well boiled out is impregnated with 10 gm. 2,3-hydroxynaphthoyl 4'-amino-diphenyl dissolved in 30 cc. of 33% caustic soda solution, 25 cc. Turkey red oil and 300 cc. water brought to the boil and diluted with water to 1000 cc. The material instantly takes up the dissolved product and becomes intensely yellow. It is handled for 30 minutes and then wrung out well and developed in the following diazo solution.

5 gm. meta-nitro-para-toluidine $(CH_3:NH_2:NO_2—1:4:5)$ are diazotized in the usual manner, the solution is diluted with water to the desired volume, the mineral acid neutralized with sodium acetate and 50 gm. sodium chloride per liter are added.

In this manner a very intense Turkey red shade is produced on the fibre of excellent fastness to light and kier boiling. The material is thoroughly rinsed, soaped hot, rinsed again and dried.

Example 3

The impregnation of the cotton is carried out as in Example 2 with the exception that instead of 10 gm. 2,3-hydroxynaphthoyl-4'-amino-diphenyl, 11 gm. of 2,3-hydroxynaphthoyl 4'-amino, 4''-chloro-diphenyl are employed.

As the diazo comopund tetrazotized dianisidine may be employed which is prepared as follows:

5 gm. dianisidine are tetrazotized in the usual manner and neutralized with sodium bicarbonate solution.

A dark navy blue shade is so obtained of very good fastness to soaping, kier boiling and chlorine. The dyestuff corresponds probably to the following formula:

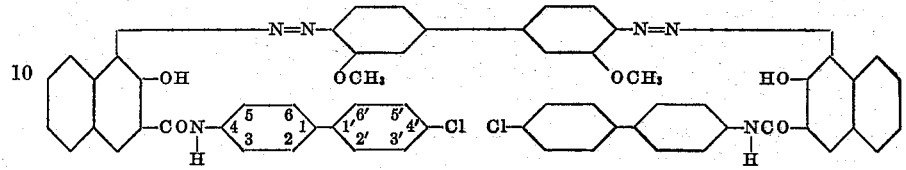

Example 4

10 gm. of 2,3-hydroxynaphthoyl 4'-amino-4''-methoxy-diphenyl are well stirred with 25 cc. caustic soda solution of 33% NaOH and 20 cc. of Turkey red oil, dissolved with 300 cc. of boiling water and made up to 1 litre.

Cotton material is impregnated with this solution, after first having been well wetted out. After 30 minutes it is well wrung out and then developed in the following diazo bath.

6 gm. of 4-chloro-1,2-toluidine are diazotized in the usual manner and diluted with cold mater to 1 litre, neutralized with sodium acetate and 50 gm. of common salt are added.

A bright bluish red is obtained with very good fastness properties.

Due to the great affinity of the 2,3-hydroxynaphthoyl-4'-amino-diphenyls and their substitution products to the vegetable fibre it is possible to use these products also for printing. This can be done by proceeding the usual way: The cotton goods are padded with said diphenyls in caustic soda solution with or without the addition of alcohol and dried. The printing color is prepared by incorporating the diazo solutions into a suitable printing paste.

Another way of printing these azodyestuffs consists of combining the 2,3-hydroxynaphthoyl-4'-aminodiphenyls with the nitrosamine salts of diazotizable amino-bodies in an alkaline solution and a printing paste and developing the colors with the aid of an acid after drying.

The following table gives the color of a number of the dyestuffs according to my invention:

| Diazo compound of | Combined with | Shade |
|---|---|---|
| 2,5-dichloraniline | 2,3-hydroxynaphthoyl-4-amino-diphenyl. | Orange. |
| 3-nitro-4-amino-1-methyl-benzene. | do | Red. |
| 2-amino-diphenyl | do | Do. |
| 4-amino-diphenyl | do | Bluish red. |
| Amino-azo-ortho-toluene | do | Bordeaux. |
| Meta-phenylene-diamine | do | Brown. |
| Benzidine | do | Violet. |
| Saffranine | do | Greenish blue. |
| Dianisidine | do | Reddish blue. |
| 4-ethoxy benzene-azo-1-naphthylamine. | do | Black. |
| 4-chloro-1,2-toluidine | do | Red. |
| 5-nitro-1,2-toluidine | do | Bordeaux. |
| 2,5-dichloraniline | 2,3-hydroxynaphthoyl-4-amino-4''-chloro-diphenyl. | Reddish orange. |
| 3-nitro-4-amino-1-methyl-benzene. | do | Bluish red. |
| Dianisidine | do | Blue. |
| Tolidine | do | Blueblack. |
| 5-nitro-1,2-anisidine | do | Red. |
| 2,5-dichloraniline | 2,3-hydroxynaphthoyl-4'-amino-4''-methoxy-diphenyl. | Do. |
| 5-nitro-1,2-anisidine | do | Do. |
| 4-amino-4'-methoxy-diphenyl. | do | Violet. |
| 5-nitro-1,2-toluidine | do | Bluish red. |

Now what I claim and desire to secure by Letters Patent is the following:

1. Process for the manufacture of azo dyestuffs, which process comprises combining an aromatic diazo compound with 2,3-hydroxynaphthoyl-4-amino-4'-chloro-diphenyl.

2. Process for the manufacture of azo dyestuffs, which process comprises combining an aromatic diazo compound with 2,3-hydroxy-naphthoyl-4-amino-4'-methoxy-diphenyl.

3. Process for the manufacture of azo dyestuffs, which process comprises combining a diazo compound of the formula:

$$Cl—N=N—aryl$$

wherein aryl means a radical of a diazotized aromatic amine having hydrogen, halogen, nitro, hydroxy, methoxy, ethoxy, methyl, ethyl and phenyl groups in one or more positions with a 2,3-hydroxy-naphthoyl-4-amino-diphenyl of the formula:

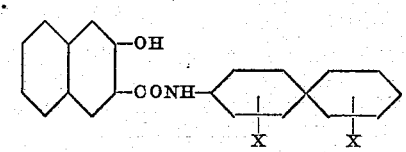

wherein X represents hydrogen, alkyl, alkoxy, halogen, hydroxy, nitro or phenyl.

4. Azo dyestuffs corresponding to the general formula:

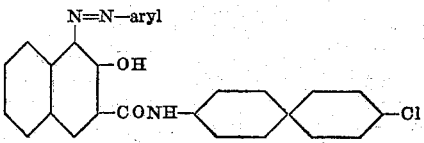

5. Azo dyestuffs corresponding to the general formula:

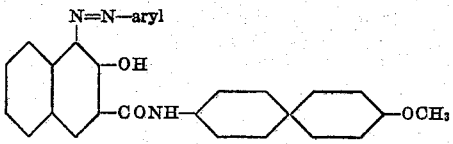

6. Azo dyestuffs corresponding to the general formula:

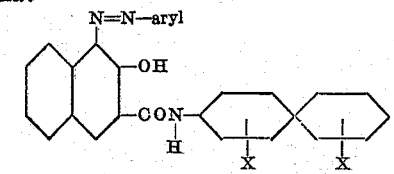

wherein aryl means a radical of a diazotized aromatic amine having hydrogen, halogen, nitro, hydroxy, methoxy, ethoxy, methyl, ethyl, and phenyl groups in one or more positions, and wherein X represents hydrogen, alkyl, alkoxy, halogen, hydroxy, nitro or phenyl.

7. The water-insoluble azo dyestuffs of the general formula:

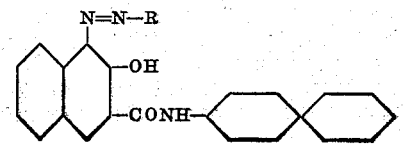

wherein R represents a radical of a diazotized aromatic amine, and wherein the diphenyl nucleus may be substituted by alkyl, alkoxy, halogen, hydroxy, the nitro- or phenyl group.

8. Azo dyestuffs corresponding to the general formula:

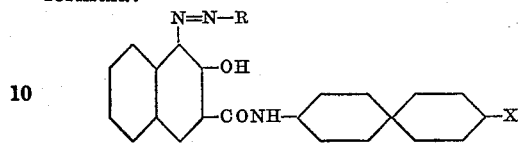

wherein R is a radical of the benzene series, and X stands for hydrogen, chlorine and methoxy.

9. The azo dyestuff having the formula:

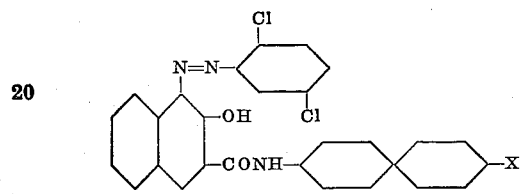

wherein X stands for hydrogen or chlorine.

10. The azo dyestuff having the formula:

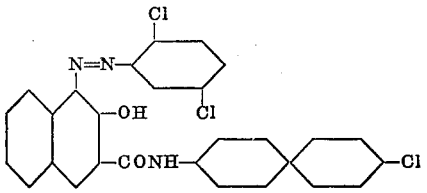

11. The azo dyestuff having the formula:

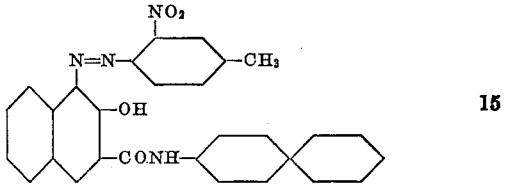

12. Fiber dyed with the dyestuffs of claim 6.
13. Fiber dyed with the dyestuffs of claim 4.
14. Fiber dyed with the dyestuffs of claim 5.
15. Fiber dyed with the dyestuff of claim 9.
16. Fiber dyed with the dyestuff of claim 10.
17. Fiber dyed with the dyestuff of claim 11.

WILLIAM EDWARD KEMMERICH.